United States Patent
Thompson et al.

(10) Patent No.: US 7,523,991 B2
(45) Date of Patent: Apr. 28, 2009

(54) VEHICLE SEAT STRUCTURE

(75) Inventors: Bryan Scot Thompson, San Diego, CA (US); Raymond Devers, San Diego, CA (US); Anke Mazzei, Encinitas, CA (US); Hideshi Saiki, San Diego, CA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/668,705

(22) Filed: Jan. 30, 2007

(65) Prior Publication Data

US 2008/0179924 A1 Jul. 31, 2008

(51) Int. Cl.
*A47C 7/02* (2006.01)
(52) U.S. Cl. .............. 297/452.62; 297/452.58; 297/452.61; 297/452.38
(58) Field of Classification Search ............ 297/188.01, 297/188.04, 188.05, 188.07, 188.2, 188.21, 297/219.1–229, 452.58, 452.61, 452.62, 297/452.38, 463.2; 248/205.2
See application file for complete search history.

(56) References Cited

U.S. PATENT DOCUMENTS

| | | | | |
|---|---|---|---|---|
| 3,154,345 A | * | 10/1964 | Lambrecht | 297/188.09 |
| 3,833,454 A | * | 9/1974 | Ambrose | 297/452.57 |
| 4,711,495 A | * | 12/1987 | Magder | 297/452.52 |
| 4,747,639 A | * | 5/1988 | Pfau | 297/219.1 |
| 4,844,539 A | * | 7/1989 | Selbert | 297/228.13 |
| 5,007,676 A | | 4/1991 | Lien | |
| 5,235,826 A | * | 8/1993 | Brooks et al. | 66/169 R |
| 5,242,063 A | * | 9/1993 | Ericksen et al. | 211/65 |
| 5,314,232 A | * | 5/1994 | Hopkins | 297/188.06 |
| 5,356,061 A | | 10/1994 | Yu | |
| 5,533,787 A | * | 7/1996 | Xiang | 297/284.5 |
| 5,628,438 A | | 5/1997 | Legrow | |
| 5,628,543 A | | 5/1997 | Filipovich et al. | |
| 5,664,673 A | * | 9/1997 | Perry | 206/371 |
| 5,669,670 A | * | 9/1997 | Haraguchi et al. | 297/452.61 |
| 5,785,381 A | | 7/1998 | Carter | |
| 5,957,357 A | * | 9/1999 | Kallman | 224/675 |
| 6,000,664 A | * | 12/1999 | Hood | 248/102 |
| 6,098,558 A | * | 8/2000 | Baird | 112/475.08 |
| 6,293,580 B1 | * | 9/2001 | Lachat et al. | 280/728.3 |
| 6,371,562 B1 | * | 4/2002 | Yoshimura et al. | 297/452.61 |
| 6,676,209 B1 | * | 1/2004 | Szabo et al. | 297/219.1 |
| 6,769,146 B2 | * | 8/2004 | Copeland et al. | 5/653 |
| 7,025,423 B2 | * | 4/2006 | Fujita et al. | 297/452.38 |
| 2004/0183347 A1 | | 9/2004 | Szabo et al. | |

* cited by examiner

*Primary Examiner*—Laurie K Cranmer
(74) *Attorney, Agent, or Firm*—Global IP Counselors, LLP

(57) ABSTRACT

A vehicle seat includes a seat assembly having an exposed non-seating surface that includes one of a hook material and a loop material. The seat assembly also includes at least one removable storage element having a surface portion covered with the other of the hook material and the loop material. The removable storage element further removably attaches to a portion of the exposed non-passenger supporting surface in any one of a plurality of orientations and positions.

18 Claims, 6 Drawing Sheets

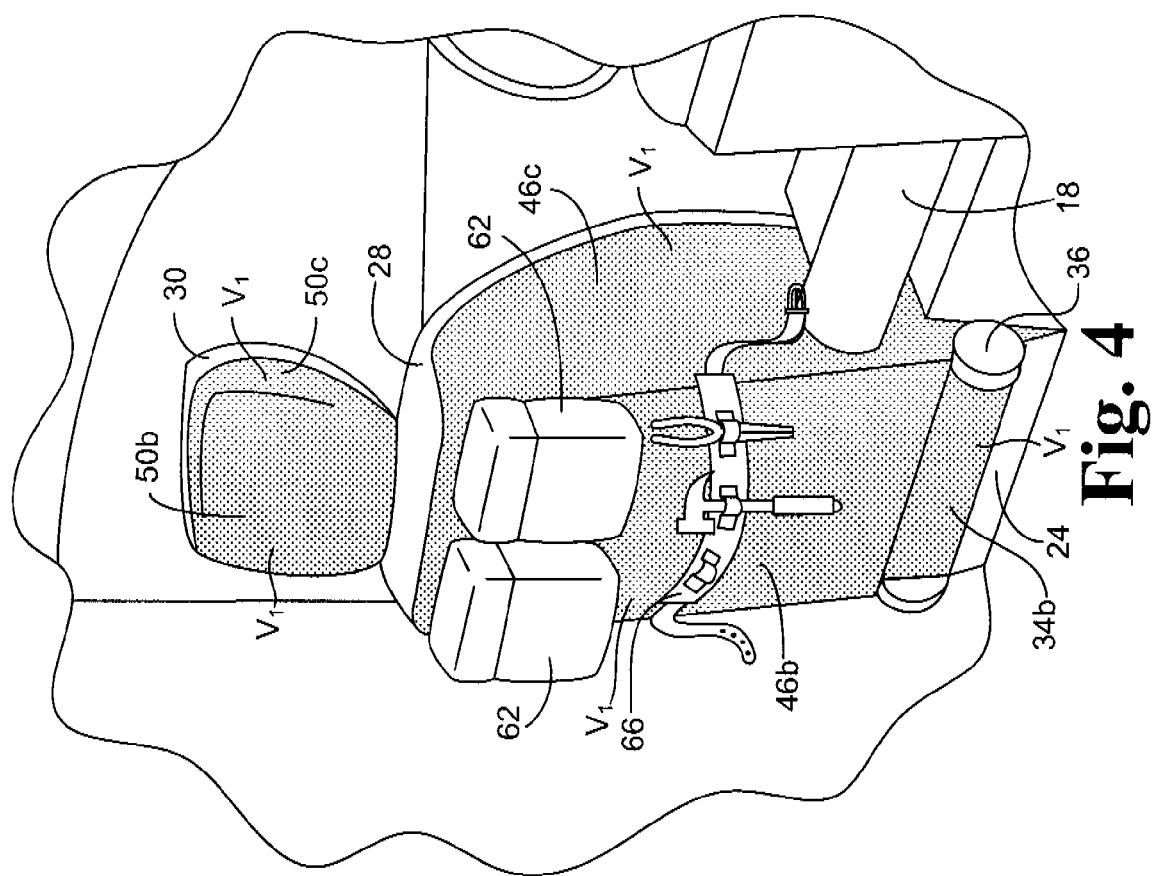

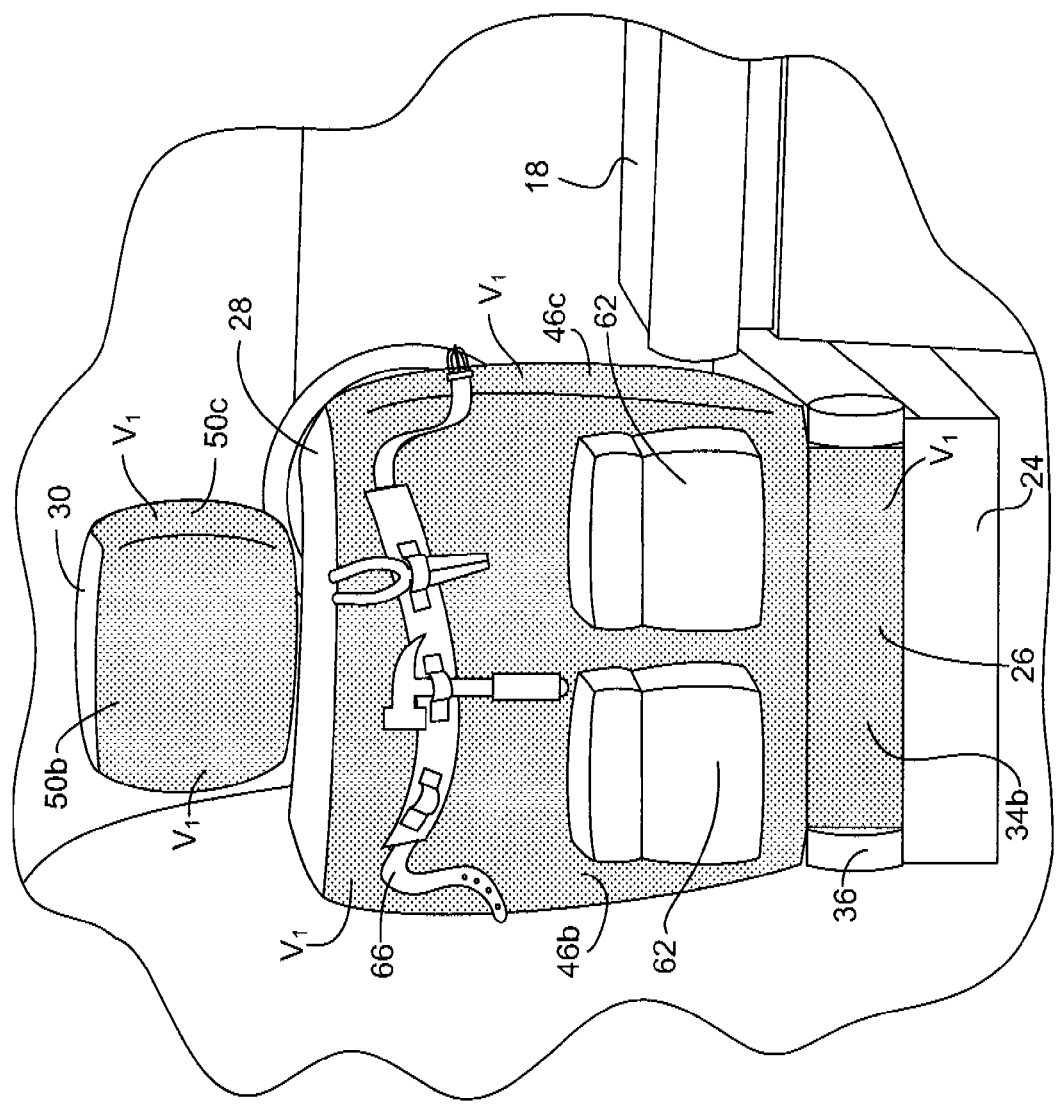

VEHICLE SEAT STRUCTURE

BACKGROUND OF THE INVENTION

1. Field of the Invention

The present invention relates to vehicle seat structure. More specifically, the present invention relates to vehicle seat structure that includes removable/reattachable storage features.

2. Background Information

Vehicles are continuously being improved to provide increased utility and functionality. One vehicle feature that has been required recently is improved storage space. Improvements in storage space are particularly valuable in commercial applications, where a technician or repair person frequently accesses, uses and stores the same tools and equipment repeatedly during the course of a work day. Easy access to such tools and equipment is imperative for such professionals. Frequently accessed tools and equipment are most conveniently accessed if stored on a vertical surface.

One recent improvement to such storage includes a frame that hooks on to the back of a seat. The frame includes canvas pockets on a vertical surface to store toys for children seated behind the seat. The frame is retained on the seat by a series of straps that wrap around the seat.

Such a frame is unattractive and the straps that hold the frame to the seat are bothersome to passengers and drivers in that they interfere with seat comfort. Further, such a frame and corresponding storage pockets may be adequate to store children toys but are not practical for commercial usages.

In view of the above, it will be apparent to those skilled in the art from this disclosure, that there exists a need for improved storage features in a vehicle that are easily accessed by drivers and passengers but do not interfere with seating. The present invention addresses this need in the art as well as other needs, which will become apparent to those skilled in the art from this disclosure.

SUMMARY OF THE INVENTION

It has been discovered that in order to provide easy access to regularly used tools, equipment and accessories kept in a vehicle, it is advantageous to keep such tools, equipment and accessories on a vertical surface for easy access.

One object of the present invention is to provide storage space(s) on exposed vertical or slightly inclined surfaces of the seats within a vehicle.

Another object of the present invention is to provide a flexible storage space within a vehicle that has no adverse impact on the driver or passengers within the vehicle.

In accordance with one aspect of the present invention, a vehicle seat includes a seat assembly and at least one removable storage element. The seat assembly has an exposed non-seating surface that includes one of a hook material and a loop material. The at least one removable storage element has a surface portion that is covered with the other of the hook material and the loop material. Consequently, the storage element is removably attachable to a portion of the exposed non-passenger supporting surface in any one of a plurality of orientations and positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is another perspective view of the seat showing another rear portion thereof with several removable storage elements fastened to the seat in a second configuration in accordance with one embodiment of the present invention;

FIG. 5 is another perspective view of the seat similar to FIG. 3 showing several removable storage elements fastened to the seat in a third configuration in accordance with one embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
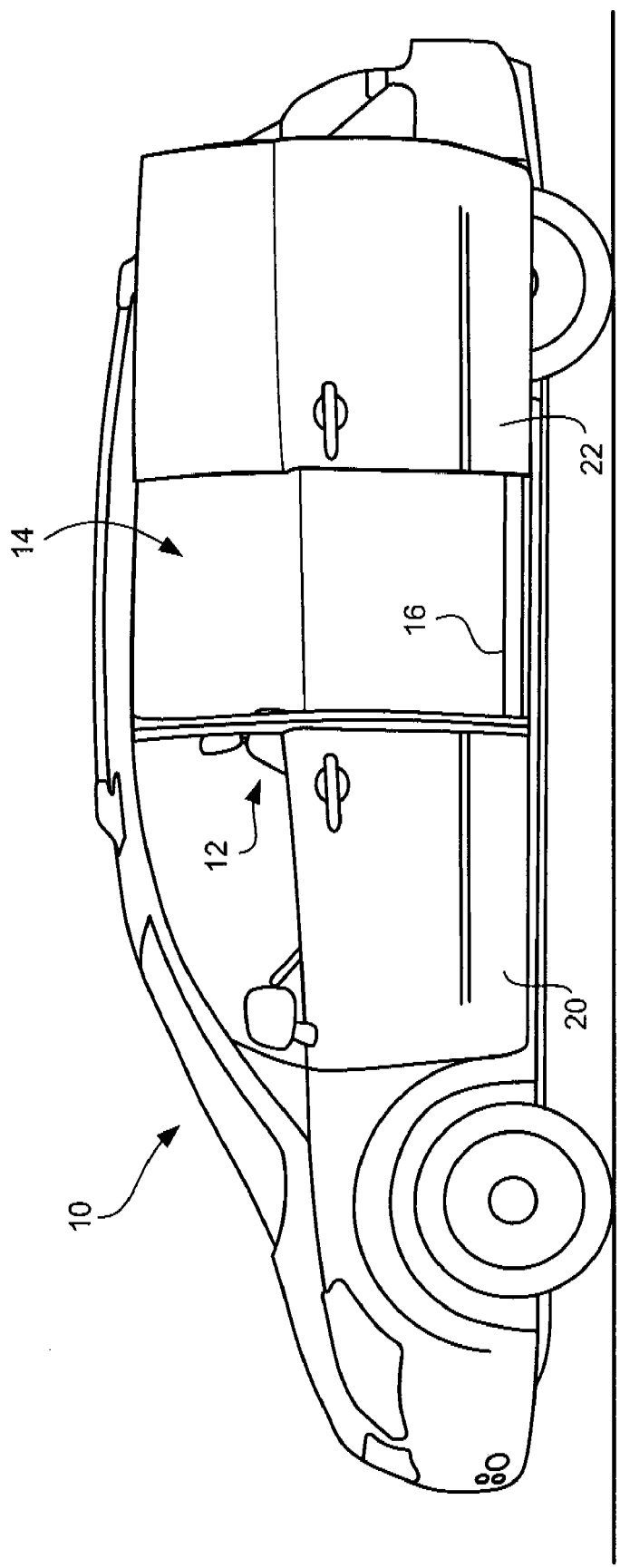
FIG. 1 is a side elevational view of a vehicle showing a seat that includes one of a loop material and a hook material on a portion thereof in accordance with one embodiment of the present invention.

Referring initially to FIG. 1, a vehicle 10 having a multi-purpose seat 12 is illustrated in accordance with a first embodiment of the present invention.

Figure 2:
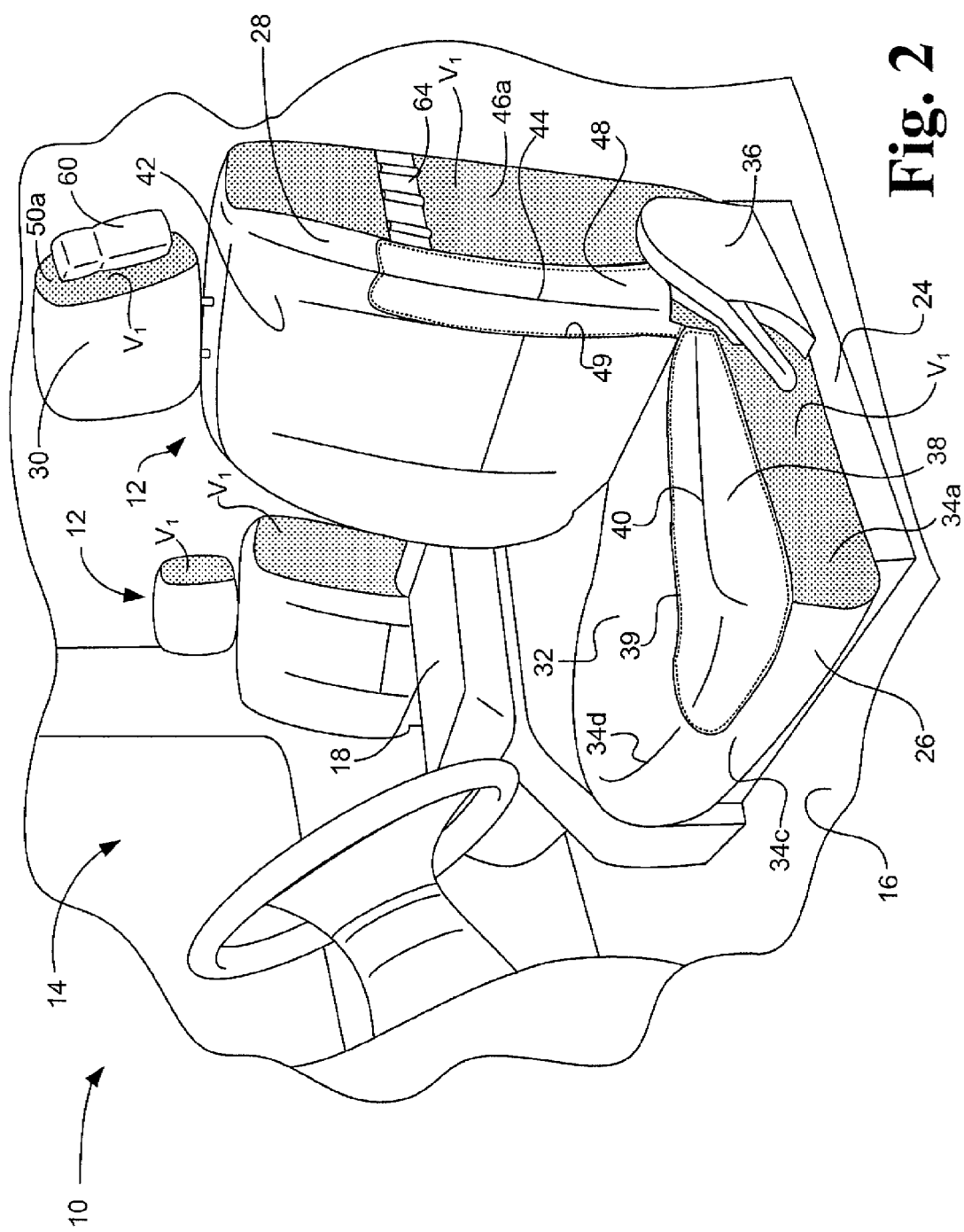
FIG. 2 is a perspective view of a portion of the vehicle showing the seat with at least one removable storage element fastened to a portion thereof in accordance with one embodiment of the present invention.

As shown in FIGS. 1 and 2, the vehicle 10 basically includes (among other things) a passenger compartment 14, a floor 16, a center console 18 (shown in FIG. 2), doors 20 and 22 and at least one or preferably two of the seats 12.

The seats 12 of the present invention include exposed surfaces thereof that include one of a two part fastening material attached thereto, such as one of a hook material and a loop material that together are known as Velcro®. Any object that includes an exterior surface that includes the other of the hook and loop materials can be removably attached to the seats 12. The seat 12 therefore provides a plurality of vertical and/or inclined storage surfaces that allow for flexible storage of any of a variety of items or materials. Since the seats 12 include generally the same features, a description of only one seat 12 is provided for the sake of brevity.

Figure 3:
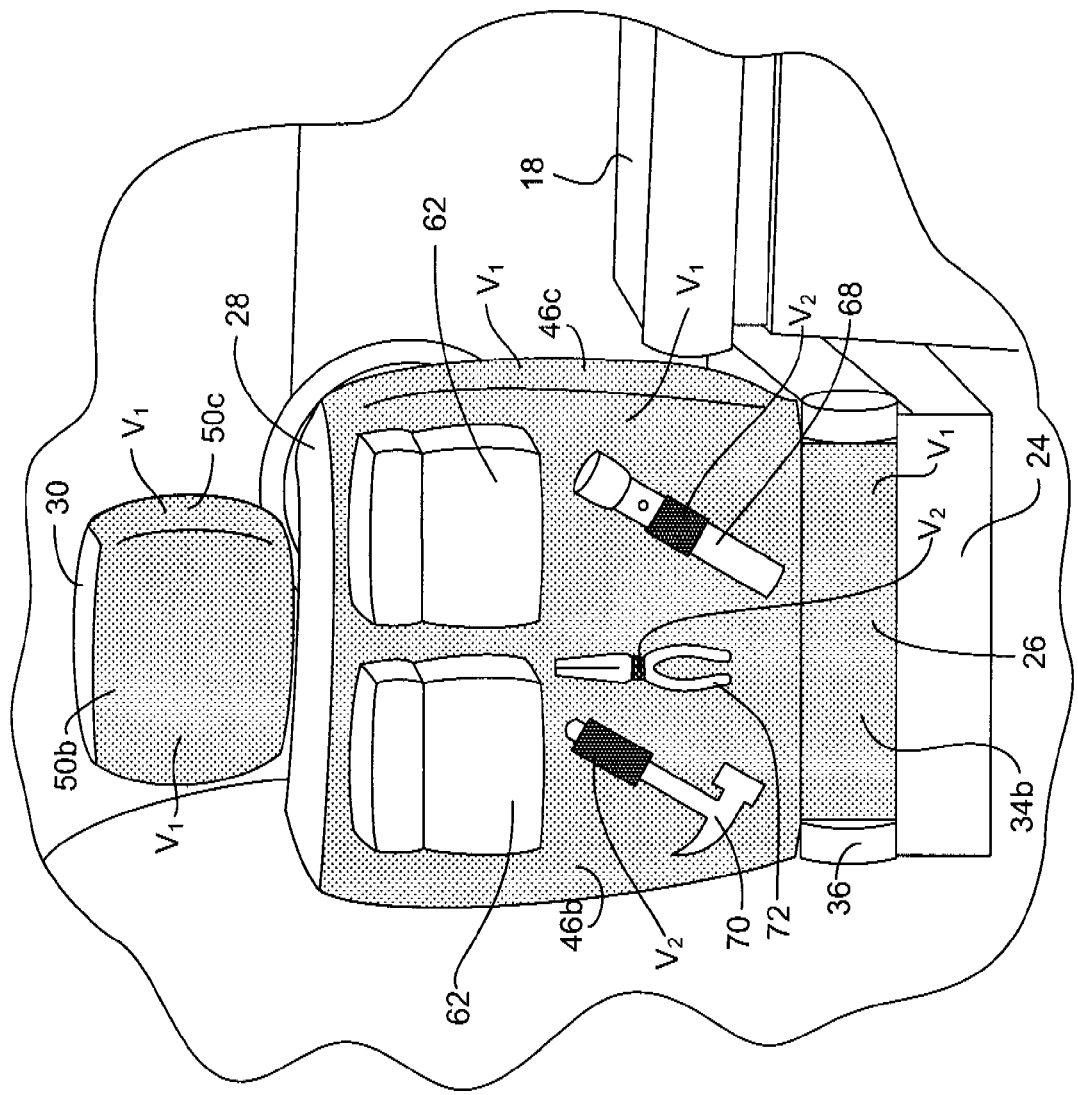
FIG. 3 is another perspective view of the seat showing a rear portion thereof with several removable storage elements fastened to the seat in a first configuration in accordance with one embodiment of the present invention.

As shown in FIGS. 2 and 3, the seat 12 basically includes a base 24, a lower seat portion 26, a seatback portion 28 and a headrest 30. The base 24 is preferably fixed to the floor 16 of the vehicle 10 within the passenger compartment 14. The base 24, the lower seat portion 26, the seatback portion 28 and the headrest 30 are connected to one another in a conventional manner. For example, the lower seat portion 26 is moveably fixed to the base 24 such that the lower seat portion 26 can move forward and backward to accommodate differing sized drivers. The lower seat portion 26 can also include a seat tilting mechanism (not shown) and/or a heater (not shown). For instance, the lower seat portion 26 can be provided with a mechanism (not shown) that changes the overall angle of the lower seat portion 26 relative to the floor 16. In other words, the lower seat portion 26 and the base 24 can include any of a variety of features typically found in a vehicle seat.

With continuing reference to FIGS. 2 and 3, the lower seat portion 26 is basically a seat cushion portion configured to support a passenger or driver of the vehicle 10. The lower seat portion 26 (the seat cushion portion) includes a seating surface 32, exposed non-seating surfaces 34a (FIG. 2) and 34b (FIG. 3), a front upright surface 34c (FIG. 2), a front edge 34d defined between the seating surface 32 and the front upright surface 34c, a support mechanism 36, a reinforcing material 38 and an edge or corner 40 that defines a boundary between the seating surface 32 and the exposed non-seating surface 34a. As shown in FIG. 2, the exposed non-seating surfaces 34a is an outboard surface that is adjacent to a door 20 (door 20 is not visible in FIG. 2).

The lower seat portion 26 is covered with a material suitable (an outer covering material) for providing seating for a passenger or driver of a vehicle, such as a textile material. As indicated in FIG. 2, the seating surface 32 is defined on the outer covering material.

As shown in FIGS. 2 and 3, the support mechanism 36 is configured to support the seatback portion 28 in a generally upright orientation. The support mechanism 36 can include an angle adjusting mechanism that allows for changing an angle of inclination of the seatback portion 28 in a conventional manner or can maintain the seatback portion 28 in a fixed upright or slightly inclined orientation.

The exposed non-seating surfaces 34a and 34b are at least partially covered with a material $V_1$ that is one of the hook material and a loop material such as one of the two fastening materials that together are known as Velcro®. As shown in FIG. 2, a lateral side of the lower seat portion 26 defines the exposed non-seating surfaces 34a. As shown in FIG. 3, the exposed non-seating surface 34b is defined at the rear of the lower seat portion 32. The exposed non-seating surfaces 34a and 34b are at least partially covered with the material $V_1$.

The reinforcing material 38 is preferably a heavy duty material such as a generally smooth leather or a leather-like material that stands up to heavy wear and tear. As shown in FIG. 2, the reinforcing material 38 is installed over a portion of the seating surface 32, around at least a portion of the corner 40 and also covers a portion of the exposed non-seating surface 34a. The reinforcing material 38 also extends part way along a portion of the front upright surface 34c and over a portion of the front edge 34d The reinforcing material 38 is provided to give the lower seat portion 32 durability and resistance to wear conunonly associated with commercial usage. Specifically, with constant in and out of the vehicle 10 by the driver or passenger, the portion of the lower seat portion 26 around the corner 40 wears out more quickly in the absence of the reinforcing material 38. Therefore, the inclusion of the reinforcing material 38 prolongs the usable life of the seat 12. As indicated in FIG. 2, the reinforcing material 38 is permanently fixed to the lower seat portion 26 by stitching 39.

As shown in FIGS. 2 and 3, the seatback portion 28 is located adjacent to the lower seat portion 26 and has a passenger back supporting surface 42, an edge or corner 44, a plurality of second exposed non-passenger supporting surfaces 46a (FIG. 2), 46b (FIG. 3) and 46c (FIG. 3) and a reinforcing material 48 (FIG. 2). The corner 44 defines a boundary between the passenger back supporting surface 42 and the second exposed non-seating surface 46a.

The seatback portion 28 is covered with a material suitable (an outer covering material) for providing support for a passenger or driver of a vehicle, such as a textile material. As indicated in FIG. 2, the passenger back supporting surface 42 is defined on the outer covering material.

The second exposed non-passenger supporting surfaces 46a, 46b and 46c are at least partially covered with the material $V_1$, which is one of the hook material and the loop material such as one of the two fastening materials that together are known as Velcro®.

As shown in FIG. 2, an outboard lateral side of the passenger back supporting surface 42 defines one of the second exposed non-seating surfaces 46a. As shown in FIG. 3, the second exposed non-seating surface 46b is defined at the rear of the passenger back supporting surface 42 and the second exposed non-seating surface 46c is defined at a lateral inboard side of the passenger back supporting surface 42.

The reinforcing material 48 is preferably a heavy duty material such as leather or a leather-like product that stands up to heavy wear and tear. As shown in FIG. 2, the reinforcing material 48 is installed over a portion of the passenger back supporting surface 42, around and over a portion of the edge or corner 44 and also covers a portion of the second exposed non-passenger supporting surface 46a (an outboard surface). The reinforcing material 48 is provided to give resistance to commercial usage. Specifically, with constant in and out of the vehicle 10 by the driver or passenger, the portion of the seatback portion around the corner 44 wears out more quickly in the absence of the reinforcing material 48. Therefore, the inclusion of the reinforcing material 48 prolongs the usable life of the seat 12. As indicated in FIG. 2, the reinforcing material 48 is permanently fixed to the seatback portion 28 by stitching 49.

The headrest 30 is supported to the seatback portion 28 (the seat upright portion). The headrest 30 can be fixedly attached to the seatback portion 28 or can alternatively be configured to be raised and lowered in a conventional manner. The headrest 30 includes third exposed non-passenger supporting surfaces 50a (FIG. 2), 50b (FIG. 3) and 50c (FIG. 3) which are all at least partially covered with the material $V_1$.

As described above, the exposed non-seating surfaces 34a and 34b of the lower seat portion 26, the second exposed non-passenger supporting surfaces 46a, 46b and 46c of the seatback portion 28 and the third exposed non-passenger supporting surfaces 50a, 50b and 50c of the headrest 30 are all covered with the material $V_1$, which is one of the two fastening materials that together are known as Velcro®. Consequently, any item or material that is covered with the other of the two fastening materials known as Velcro® can be removably fastened thereto. Specifically, the hook material and the loop material removably attach to one another. An article, tool, storage element or tool storage element with the hook material attached to one of its outer surfaces will removably fasten to a surface of a seat covered with the loop material.

The present invention includes at least one of a plurality of articles, storage elements and tools that include a surface portion covered with the other of the hook material and loop material known as Velcro®. Consequently, the storage element and/or tool removably attaches to a portion of any one of the exposed non-passenger supporting surface in any one of a plurality of orientations and positions.

Figure 7:
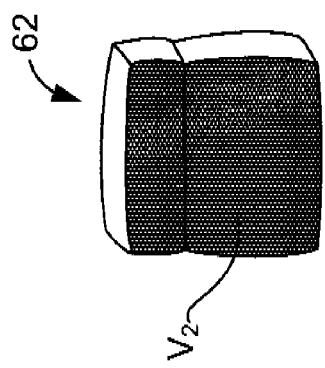
FIG. 7 is a perspective view of a second one of the removable storage elements showing the other of the loop material and the hook material on a portion thereof in accordance with one embodiment of the present invention.
Figure 9:
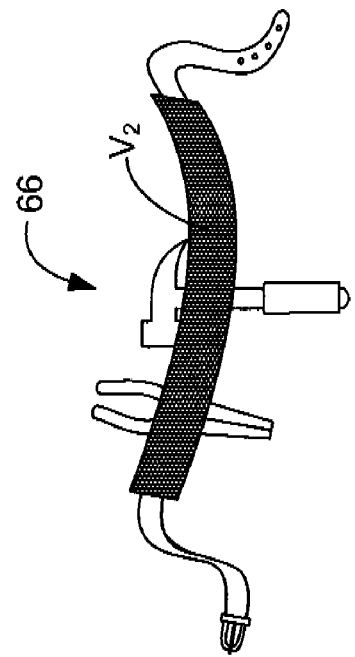
FIG. 9 is a perspective view of a fourth one of the removable storage elements showing the other of the loop material and the hook material on a portion thereof in accordance with one embodiment of the present invention.
Figure 6:
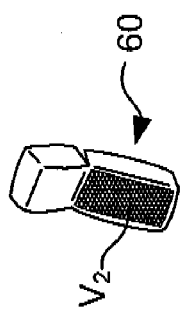
FIG. 6 is a perspective view of one of the removable storage elements showing the other of the loop material and the hook material on a portion thereof in accordance with one embodiment of the present invention.
Figure 8:
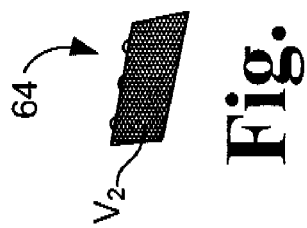
FIG. 8 is a perspective view of third one of the removable storage elements showing the other of the loop material and the hook material on a portion thereof in accordance with one embodiment of the present invention.

For example, the storage elements and tools can include a storage pouch 60 as shown in FIGS. 2 and 6, a pouch or storage compartment 62 shown in FIGS. 3, 4, 5 and 7, a tool strap 64 shown in FIGS. 2 and 8, a tool belt 66 as shown in FIGS. 4, 5 and 9, and tools 68, 70 and 72 depicted in FIG. 3.

The storage pouch 60 can be a closable pocket or pouch that is dimensioned to retain a cell telephone. The storage pouch 60 can be made of any of a variety of materials such as textile, leather, plastic, composite materials or metal. As shown in FIG. 6, a surface of the storage pouch 60 is covered with a material $V_2$ that is the other of the hook material and loop material known as Velcro®. The storage pouch 60 is depicted in FIG. 2 removably attached to the third exposed non-passenger supporting surface 50a on the headrest 30. It should be understood from the description and drawings that the storage pouch 60 can be attached to any of the exposed non-seating surfaces 34a, 34b, 46a, 46b, 46c, 50a, 50b and/or 50c.

As shown in FIG. 7, the storage compartments 62 are openable/re-closable containers, bags or pouches that also include the material $V_2$ on a back surface thereof. The storage compartments 62 can be made of any of a variety of materials, such as canvas (textile), leather, plastic, composite materials or metal. The storage compartments 62 are fastened via the Velcro® materials to the second exposed non-passenger supporting surface 46b as shown in FIGS. 3, 4 and 5. It should be understood from the description and drawings that the storage compartments 62 can be attached to any of the exposed non-seating surfaces 34a, 34b, 46a, 46b, 46c, 50a, 50b and/or 50c.

As shown in FIGS. 2 and 8, the tool strap 64 is basically an array of elastic ribs configured to retain elongated objects such as pens, pencils and/or screwdrivers (not shown). As shown in FIG. 8, the back side of the tool strap 64 is covered with the material $V_2$. The tool strap 64 is fastened via the Velcro® materials to the exposed non-seating surface 34a of the seat back portion 28. It should be understood from the description and drawings that the tool strap 64 can be attached to any of the exposed non-seating surfaces 34a, 34b, 46a, 46b, 46c, 50a, 50b and/or 50c.

As shown in FIGS. 4, 5 and 9, the tool belt 66 is basically an article to be worn by a craftsman that is configured to retain an array of tools such as a hammer, pliers, screwdrivers, etc. The tool belt 66 can be made of leather, textile or woven plastic or micro-fiber materials or other flexible materials, and includes a plurality of loops and/or pockets for retaining tools and small fasteners. A surface of the tool belt 66 is also covered with the material $V_2$ as shown in FIG. 9. As shown in FIGS. 4 and 5, the tool belt 66 is fastened via the Velcro® materials to the second exposed non-passenger supporting surface 46b in a variety of locations. It should be understood from the description and drawings that the tool belt 66 can be attached to any of the exposed non-seating surfaces 34a, 34b, 46a, 46b, 46c, 50a, 50b and/or 50c.

As shown in FIG. 3, the tool 68 is a flashlight that includes the material $V_2$ on a portion thereof. As also shown in FIG. 3, the tool 70 is a hammer that includes the material $V_2$. As further shown in FIG. 3, the tool 72 is a pair of pliers that include the material $V_2$. Hence, the tools 68, 70 and 72 can be removably fastened to any of the exposed non-seating surfaces 34a, 34b, 46a, 46b, 46c, 50a, 50b and/or 50c.

With the exposed non-seating surfaces 34a, 34b, 46a, 46b, 46c, 50a, 50b and 50c covered with one of the hook material and loop material, any article, tool, compartment or tool belt that includes the other of the hook material and loop material can be easily removably fastened thereto.

The various portions of the vehicle 10 other than the seats 12 are conventional components that are well known in the art. Since such components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat structure, comprising:
 a seat assembly having a seat cushion portion configured to support hip portions of a passenger and a seat upright portion configured to support a passenger's backside adjacent to the seat cushion portion, the seat cushion portion being covered with an outer covering material having a seating surface and a lateral outboard non-seating surface with an edge defined therebetween; and a first reinforcing material section fixed to and covering a portion of the seating surface adjacent to the lateral outboard non-seating surface, extending over the edge and covering a portion of the lateral outboard non-seating surface for providing durability and resistance to wear.

2. The vehicle seat according to claim 1, wherein the seat assembly has an exposed non-seating surface that includes one of a hook material and a loop material and at least one removable storage element having a surface portion covered with the other of the hook material and the loop material that removably attaches to a portion of the exposed non-passenger supporting surface in any one of a plurality of orientations and positions.

3. The vehicle seat structure according to claim 2, wherein the seat upright portion includes a passenger back supporting surface and a second exposed non-passenger supporting surface covered with the one of the hook material and the loop material.

4. The vehicle seat structure according to claim 3, wherein the seat assembly includes a headrest supported to the seat upright portion, the headrest having a third exposed non-passenger supporting surface covered with the one of the hook material and the loop material.

5. The vehicle seat structure according to claim 2, wherein the seat upright portion includes a passenger supporting surface and the exposed non-passenger supporting surface.

6. The vehicle seat structure according to claim 5, wherein the seat assembly includes a headrest supported to the seat upright portion, the headrest having a second exposed non-passenger supporting surface covered with the one of the hook material and the loop material.

7. The vehicle seat structure according to claim 2, wherein the seat assembly includes a headrest having a passenger supporting surface and the exposed non-passenger supporting surface.

8. The vehicle seat structure according to claim 2, further comprising
a plurality of removable storage elements each having a surface portion covered with the other of the hook material and the loop material.

9. The vehicle seat structure according to claim 8, wherein the plurality of removable storage elements are re-positionable on the exposed non-passenger supporting surface in any of a plurality of orientations and positions.

10. The vehicle seat structure according to claim 1, wherein the first reinforcing material section is a generally smooth leather-like material.

11. The vehicle seat structure according to claim 1, wherein the seat assembly has a forward upright surface extending downward from the seating surface with a front edge defined therebetween, the first reinforcing material section further extending part way along the front edge covering a portion of the forward upright surface adjacent to the lateral outboard non-seating surface.

12. The vehicle seat structure according to claim 1, wherein the first reinforcing material section is permanently fixed to the seat cushion portion by stitching.

13. The vehicle seat structure according to claim 1, wherein the outer covering material covering the seat cushion portion is a textile material.

14. A vehicle seat structure comprising:
a seat assembly having a seat cushion portion covered with an outer covering material having a seating surface and a lateral outboard non-seating surface with an edge defined therebetween;
a first reinforcing material section fixed to and covering a portion of the seating surface adjacent to the lateral outboard non-seating surface;
the seat assembly includes a seat upright portion covered with an outer covering material extending upward from the seat cushion portion having a passenger supporting surface and a lateral outboard surface with a second edge defined therebetween; and
a second reinforcing material section covering a portion of the passenger supporting surface adjacent to the second edge and adjacent to the lateral outboard seating surface and an area of the lateral outboard surface proximate the second edge.

15. The vehicle seat structure according to claim 14, wherein
the second reinforcing material section is permanently fixed to the seat upright portion by stitching.

16. The vehicle seat structure according to claim 14, wherein
the outer covering material covering the seat upright portion is a textile material.

17. The vehicle seat structure according to claim 14, wherein
the second reinforcing material section is a generally smooth leather-like material.

18. A vehicle seat structure, comprising:
a seat assembly having a seat cushion portion configured to support hip portions of a passenger and a seat upright portion configured to support a passenger's backside adjacent to the seat cushion portion, the seat assembly having a forward upright surface extending downward from the seating surface with a front edge defined therebetween, the seat cushion portion being covered with an outer covering material having a seating surface and a lateral outboard non-seating surface with an edge defined therebetween; and
a first reinforcing material section fixed to and covering a portion of the seating surface adjacent to the lateral outboard non-seating surface for providing durability and resistance to wear, the first reinforcing material section further extending part way along the front edge covering a portion of the forward upright surface adjacent to the lateral outboard non-seating surface.

* * * * *